United States Patent
Reeves et al.

(10) Patent No.: US 7,599,756 B2
(45) Date of Patent: Oct. 6, 2009

(54) PRODUCTION MOVING LINE SYSTEM AND METHOD

(75) Inventors: Brad J. Reeves, Everett, WA (US);
James S. Bradley, Arlington, WA (US);
Richard S. Irvine, Mukilteo, WA (US);
Chris G. McInelly, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 11/867,244

(22) Filed: Oct. 4, 2007

(65) Prior Publication Data

US 2009/0093900 A1    Apr. 9, 2009

(51) Int. Cl.
*G06F 19/00*    (2006.01)
*G06F 7/00*    (2006.01)

(52) U.S. Cl. .................... 700/113; 700/96; 700/228; 701/23; 701/26; 198/300; 198/301; 198/502.3

(58) Field of Classification Search .................. 700/96, 700/112, 113, 228; 701/23–26; 198/300, 198/301, 502.3, 570
See application file for complete search history.

(56) References Cited

U.S. PATENT DOCUMENTS

| | | | | |
|---|---|---|---|---|
| 3,519,150 | A * | 7/1970 | Keenan et al. | 414/273 |
| 4,472,783 | A * | 9/1984 | Johnstone et al. | 700/182 |
| 4,831,540 | A * | 5/1989 | Hesser | 700/113 |
| 5,222,855 | A * | 6/1993 | Bernard et al. | 414/331.03 |
| 6,308,107 | B1 * | 10/2001 | Conboy et al. | 700/121 |
| 7,187,998 | B2 * | 3/2007 | Okamoto et al. | 700/245 |
| 2004/0254419 | A1 * | 12/2004 | Wang et al. | 600/8 |
| 2005/0228528 | A1 * | 10/2005 | Farchmin et al. | 700/116 |
| 2006/0289637 | A1 * | 12/2006 | Brice et al. | 235/385 |
| 2007/0069022 | A1 * | 3/2007 | Hatakeyama et al. | 235/451 |

* cited by examiner

*Primary Examiner*—Ramesh B Patel
(74) *Attorney, Agent, or Firm*—Tung & Associates

(57) ABSTRACT

A production moving line system. An illustrative embodiment of the production moving line system includes at least one metallic guide strip and at least one tow vehicle which may be adapted to follow the guide strip. The tow vehicle may include control circuitry and a power source and a wireless transceiver connected to the control circuitry. An assembly fixture cart may be coupled to the tow vehicle. A wireless communication link may be provided between a central control computer and the wireless transceiver of the tow vehicle. A production moving line method is also disclosed.

20 Claims, 4 Drawing Sheets

PRODUCTION MOVING LINE SYSTEM AND METHOD

TECHNICAL FIELD

The disclosure relates to production moving line systems and methods. More particularly, the disclosure relates to a production moving line system and method in which multiple line-following tow vehicles are controlled wirelessly by a central computer.

BACKGROUND

Part moving lines may be used in assembly facilities to shuttle parts among multiple work stations. A conventional part moving line may utilize an automated guided vehicle (AGV) on which the part is placed and transported among and between the work stations. However, conventional part moving lines may suffer from any of multiple drawbacks. These may include, for example, breakdown of the entire part moving line in the event that one part of the line breaks down; duplication of tools/fixtures since the tools/fixtures may be empty as they move from an "unload position" (end of the line) to the "load position" (beginning of the line); requirement for a substantial support structure for the lines; difficulty in reconfiguration of the lines; imposition of work space by support rails for the lines; requirement for longer and more expensive curing ovens; lack of ergonomic height adjustments; and a requirement that the lines be designed and built for a maximum production rate. This requirement increases the cost of the line as well as the floor space which is required for the line.

Various types of automated guided vehicles (AGVs) exist on the market today. However, AGVs may not be "system linked" and therefore, may act as individual units that do not communicate with each other. Moreover, AGVs may be large and expensive and may not be suitable or capable of precision low speeds which may be required for part-moving lines.

SUMMARY

The disclosure is generally directed to a production moving line system. An illustrative embodiment of the production moving line system includes at least one metallic guide strip and at least one tow vehicle which may be adapted to follow the guide strip. The tow vehicle may include control circuitry and a power source and a wireless transceiver connected to the control circuitry. An assembly fixture cart may be coupled to the tow vehicle. A wireless communication link may be provided between a central control computer and the wireless transceiver of the tow vehicle.

The disclosure is further generally directed to a production moving line method. An illustrative embodiment of the production moving line method may include the steps of providing at least one metallic guide strip, providing at least one tow vehicle having a wireless transceiver in guided contact with the guide strip, coupling an assembly fixture cart to the at least one tow vehicle, providing at least one part on the assembly fixture cart, providing a central control computer, providing a wireless communication link between the central control computer and the wireless transceiver of the tow vehicle and moving the tow vehicle along the guide strip.

BRIEF DESCRIPTION OF THE ILLUSTRATIONS

DETAILED DESCRIPTION

Figure 1:
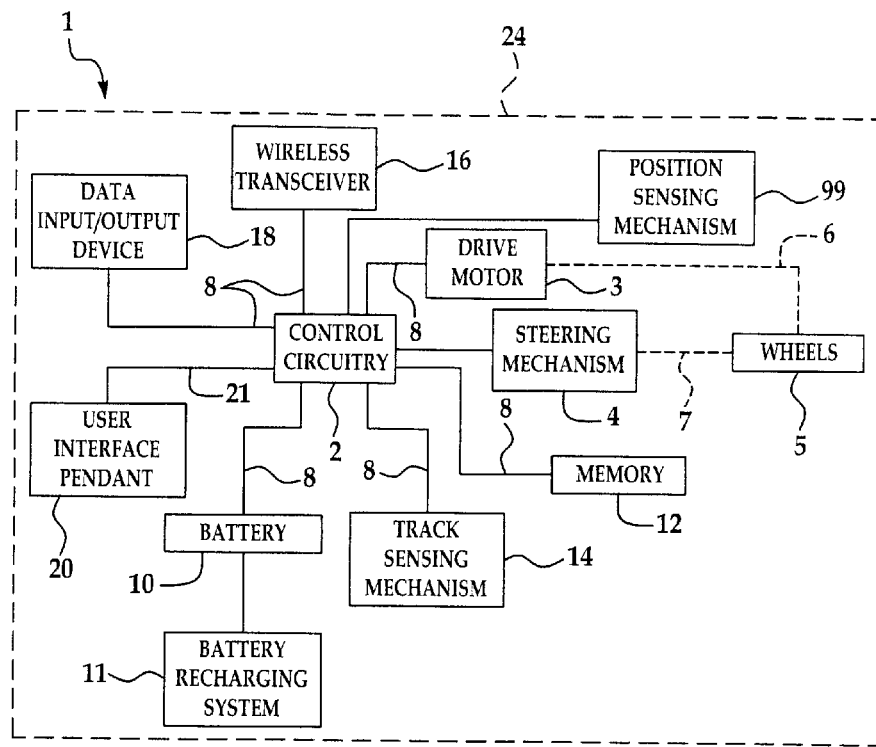
FIG. 1 is a schematic block diagram of an exemplary tow vehicle.
Figure 2:
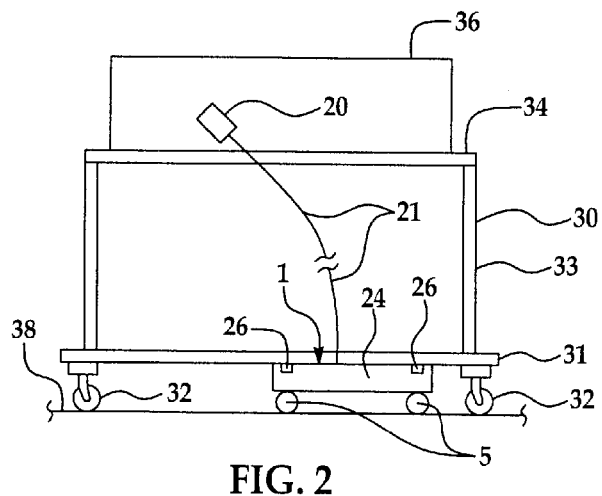
FIG. 2 is a partially schematic side view of a tow vehicle towing an assembly fixture cart on which is supported a part.
Figure 3:
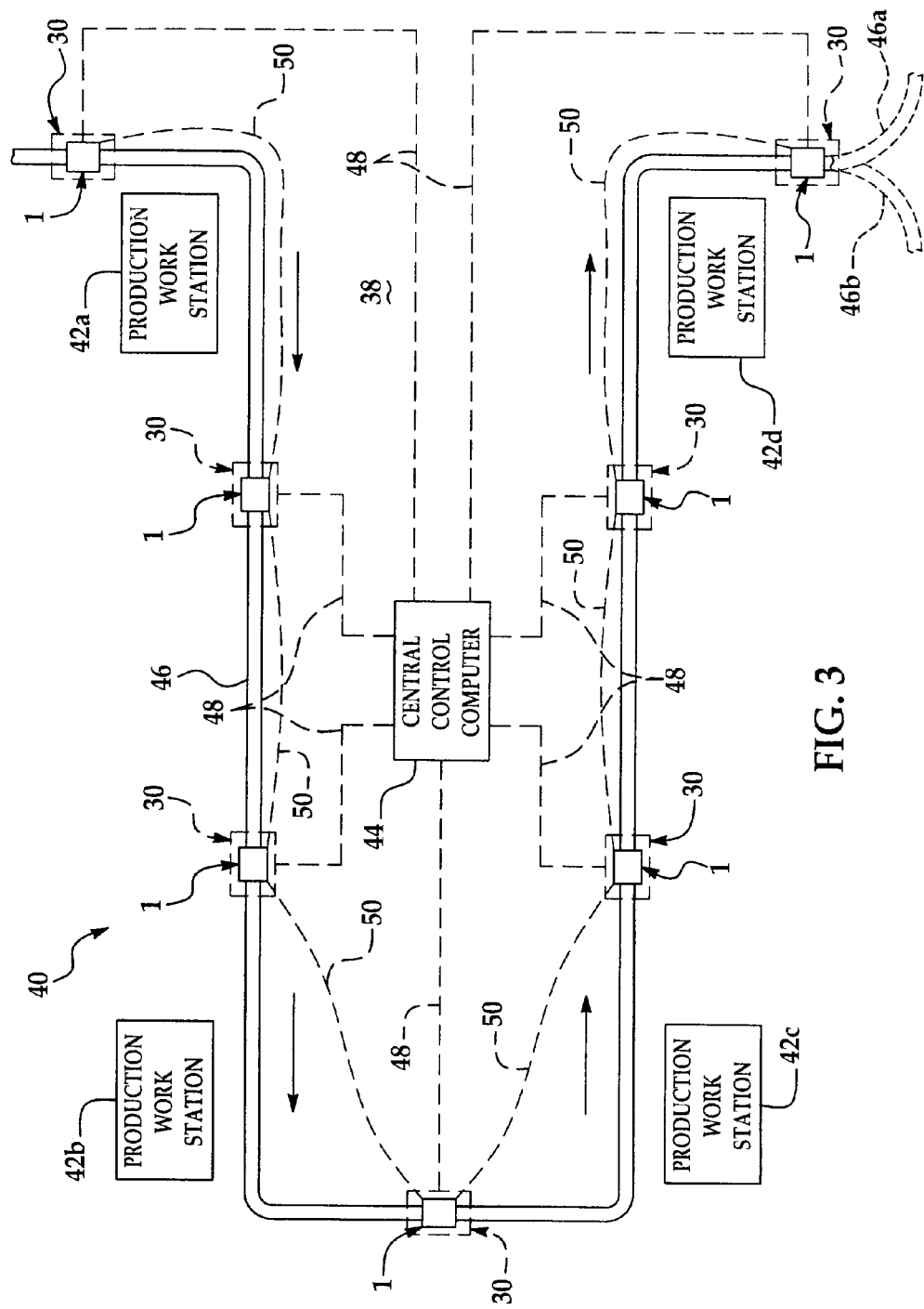
FIG. 3 is a schematic diagram of a production moving line system in an illustrative implementation of the tow vehicles.

Referring initially to FIGS. 1-3, the present disclosure is generally directed to a production moving line system 40 (FIG. 3) in which multiple line-following tow vehicles 1 may be controlled wirelessly by a central computer 44. As will be hereinafter described, each tow vehicle 1 may be adapted to tow an assembly fixture cart 30 (shown in FIG. 2 and in phantom in FIG. 3) which carries a part or parts 36 (FIG. 2) among multiple production work stations 42 in the production moving line system 40. The part or parts 36 may be modified or assembled as part of a production or assembly process. Any number of tow vehicles 1 may be provided in a single production moving line 41 and may be system linked such that the tow vehicles 1 communicate with the central control computer 44. The tow vehicles 1 may also be adapted to communicate with each other. The tow vehicles 1 may move independently of each other and at various speeds depending on the transport requirements of the production moving line system 40. In the event that one tow vehicle 1 breaks down, the remaining tow vehicles 1 may continue transport without interruption in the production moving line 41.

As shown in FIG. 1, an exemplary tow vehicle 1 which may be suitable for implementation of the production moving line system 40 is indicated in schematic block diagram form. The tow vehicle 1 may include a vehicle housing 24 (shown in phantom) which may completely or partially enclose the functional components of the tow vehicle 1. The vehicle housing 24 may have a compact design. The tow vehicle 1 may include control circuitry 2 which controls and coordinates the various functions of the tow vehicle 1. The various functional components of the tow vehicle 1 may be electrically connected to the control circuitry 2 such as through electrical connections 8 which may be wiring or direct electrical contacts, for example and without limitation.

The control circuitry 2 may have a memory 12 which is adapted to store data. A data input/output device 18 may be connected to the control circuitry 2 to facilitate input of data into and retrieval of data from the memory 12. At least one battery 10 or other power source may be connected to the control circuitry 2 to supply electrical power to the control circuitry 2 and other functional components of the tow vehicle 1. The at least one battery 10 may have sufficient electrical storage capacity to power additional tools and accessories (not shown) connected to the at least one battery 10. A battery recharging system 11 may be connected to the at least one battery 10. The battery recharging system 11 may be adapted to facilitate on-the-fly electrical recharging of the at least one battery 10 during operation of the tow vehicle 1, which will be hereinafter described.

A wireless transceiver 16 may be connected to the control circuitry 2. The wireless transceiver 16 may be adapted to facilitate wireless communication (receive and transmit data) between the tow vehicle 1 and the central control computer 44 (FIG. 3) in the production moving line system 40. The wireless transceiver 16 may also be adapted to facilitate wireless communication between the tow vehicle 1 and other tow vehicles 1 in the production moving line 41.

A drive motor 3 may be connected to the control circuitry 2. A vehicle wheel or wheels 5 may be drivingly engaged by the drive motor 3 through a mechanical coupling 6 which is suitable for the purpose. The drive motor 3 may be a variable-speed electric drive motor, for example and without limitation, and may have the capability of towing an assembly fixture cart 30 weighing at least 500 pounds at precise speeds of from 1 inch per minute to up to 3,000 inches per minute, for example and without limitation.

A steering mechanism 4 may be connected to the control circuitry 2 and coupled to the vehicle wheels 5 through a mechanical coupling 7 which enables the steering mechanism 4 to steer the vehicle wheels 5. A track sensing mechanism 14 may be connected to the control circuitry 2. The track sensing mechanism 14 may be adapted to follow a metallic floor-mounted guide strip 46 (FIG. 3) and provide data input to the control circuitry 3 which enables the steering mechanism 4 to steer the vehicle wheels 5 along the guide strip 46 of the production moving line system 41. The track sensing mechanism 14 may also be adapted to provide data input to the control circuitry 3 which enables the control circuitry 3 to terminate operation of the drive motor 3 and thus, rotation of the wheel or wheels 5 in the event that the tow vehicle 1 inadvertently leaves the guide strip 46. The control circuitry 2 may be adapted to monitor the position of the tow vehicle 1 with respect to other tow vehicles 1 moving in the production moving line 41, such as through input from the wireless transceiver 16, for example.

A user interface pendant 20 may be hard-wired to the control circuitry 2 such as through a pendant cord 21, for example. The user interface pendant 20 may be adapted to manually override commands which are transmitted from the central control computer 44 to the control circuitry 2 through the wireless transceiver 16.

The guide strip 46 of the production moving line system 40 may be a metallic passive element guide strip (not connected to a power source), in which case the track sensing mechanism 14 of each tow vehicle 1 may be adapted to sense the metallic properties of the guide strip 46. As shown in FIG. 3, the guide strip 46 may be attached to a floor 38 in a production or assembly facility. The guide strip 46 may be a strip of sheet metal, for example, and may be attached to the floor 38 using adhesive such as tape and/or glue and/or may be attached to the floor 38 using fasteners. In the example of the production moving line system 40 shown in FIG. 3, the guide strip 46 is configured to form a loop which extends generally among and adjacent to a first production work station 42a, a second production work station 42b, a third production work station 42c and a fourth production work station 42d. The guide strip 46 may be readily reshaped, lengthened, shortened or moved, as shown by the alternative pathways 46a, 46b (shown in phantom) of the guide strip 46.

The central control computer 44 may communicate with the wireless transceiver 16 (FIG. 1) of each tow vehicle 1 through a wireless communication link 48. The central control computer 44 may be programmed to control and adjust the speed of each tow vehicle 1 in order to keep the production moving line system 40 synchronized in relation to all tow vehicles 1 in the production moving line 41. The wireless transceivers 16 of the tow vehicles 1 may communicate with each other through a wireless communication link 50. Therefore, the speed of each tow vehicle 1 may be additionally adjusted depending on the proximity of each tow vehicle 1 to the next tow vehicle 1 on the production moving line 41, responsive to operation of the position sensing mechanism 99 (FIG. 1) of the tow vehicle 1.

In implementation of the production moving line system 40, each tow vehicle 1 may be adapted to tow an assembly fixture cart 30 (shown in phantom in FIG. 3) on which may be supported a part 36 or parts 36 (FIG. 2). An exemplary assembly fixture cart 30 is shown in FIG. 2 and may include a cart base 31 having multiple cart wheels 32. The cart wheels 32 may be castor-type wheels, for example and without limitation. A cart frame 33 may extend from the cart base 31. A cart platform 34 may be provided on the cart frame 33. The part 36 which is to be transported may be supported by the cart platform 34. The tow vehicle 1 may be situated between cart base 31 of the assembly fixture cart 30 and the floor 38 of the production or assembly facility. The vehicle housing 24 of the tow vehicle 1 may be coupled to the cart base 31 using a suitable coupling mechanism 26 such as clamps, for example and without limitation.

The guide strip 46 may be attached to the floor 38 of the production or assembly facility and configured in any desired configuration. The guide strip 46 may extend among or adjacent to the production work stations 42 according to the order in which the production work stations 42 sequentially implement the production or assembly process, such as by modifying and/or assembling the part or parts 36 on each assembly fixture cart 30, for example and without limitation. Multiple tow vehicles 1, each of which may be coupled to an assembly fixture cart 30, may be placed on the guide strip 46. The cart wheels 32 (FIG. 2) of each assembly fixture cart 30 and the vehicle wheels 5 (FIG. 2) of each tow vehicle 1 may rest on the floor 38 on opposite sides of the guide strip 46. At least one part 36 (FIG. 2) may be placed on each assembly fixture cart 30.

Throughout sequential transport of the parts 36 among the production work stations 42, the tow vehicles 1 may be operated to follow the guide strip 46 of the production moving line 41 in the direction indicated by the arrows in FIG. 3. Therefore, each assembly fixture cart 30, towed by a tow vehicle 1, may sequentially transport each part 36 to the first production work station 42a, the second production work station 42b, the third production work station 42c and the fourth production work station 42d, respectively. When the tow vehicle 1 which tows an assembly fixture cart 30 having a particular part or parts 36 arrives at each production work station 42, the tow vehicle 1, responsive to commands from the central control computer 44, may stop to facilitate retrieval of the part 36 from the assembly fixture cart 30. At the production work stations 42, the part 36 may be progressively modified and/or assembled throughout the production or assembly process. After modification and/or assembly at each production work station 42, the part 36 may be replaced on the assembly fixture cart 30. The tow vehicle 1 may then tow the assembly fixture cart 30 and the part 36 which is carried thereon to the next production work station 42 in the production or assembly sequence. As each tow vehicle 1 travels along the guide strip 46, the battery recharging system 11 (FIG. 1) may continually recharge the at least one battery 10.

The central control computer 44 may transmit wireless commands to each of the tow vehicles 1 via the wireless communication link 48. These wireless commands may relate to starting and stopping of the tow vehicles 1 at each production work station 42 or between the production work stations 42, as well as the speed of the tow vehicles 1. The commands may include commands for one or more of the tow vehicles 1 to switch guide strips 46, for example and without limitation. The wireless commands which are transmitted from the central control computer 44 to each of the tow vehicles 1 may enable the production moving line system 40 to stay synchronized and maintain a controlled production or assembly rate.

The position sensing mechanism 99 (FIG. 1) may continually sense the position of each tow vehicle 1 along the guide strip 46 and relay this position of the tow vehicle 1 to the control circuitry 2. Via the wireless transceiver 16 and wireless communication link 48, the control circuitry 2 may in turn transmit position-indicating data to the central control computer 44. In turn, based on the positions of the tow vehicles 1 along the guide strip 46, the central control computer 44 may determine the distance between consecutive tow vehicles 1 and may control or adjust this distance by controlling the operational speed of the drive motor 3 (FIG. 1) of each tow vehicle 1 via the wireless communication link 48. Additionally or alternatively, the control circuitry 2 of each tow vehicle 1 may determine the distance between that tow vehicle 1 and the adjacent front or rear tow vehicle 1 via the wireless communication link 50. The control circuitry 2 of the tow vehicle 1 may then relay this data via the wireless communication link 48 to the central control computer 44, which may adjust the speed of the tow vehicles 1 accordingly in order to achieve the desired distance between the consecutive tow vehicles 1. In the event that a tow vehicle 1 inadvertently leaves the guide strip 46, the track sensing mechanism 14 may notify the control circuitry 2, which may then terminate operation of the drive motor 3 of the tow vehicle 1.

In addition to control of each tow vehicle 1 by operation of the central control computer 44 via the wireless communication link 48, the tow vehicles 1 may also be manually controlled using the handheld user interface pendant 20 (FIGS. 1 and 3). This may facilitate driving of a tow vehicle 1 off the guide strip 46 in order to make changes to the production moving line 41 such as, for example and without limitation, adding or removing assembly fixture carts 30 to or from, respectively, the production moving line 41; reconfiguring the production moving line 41 for production rates; and moving the production moving line 41 to a different location.

Figure 4:
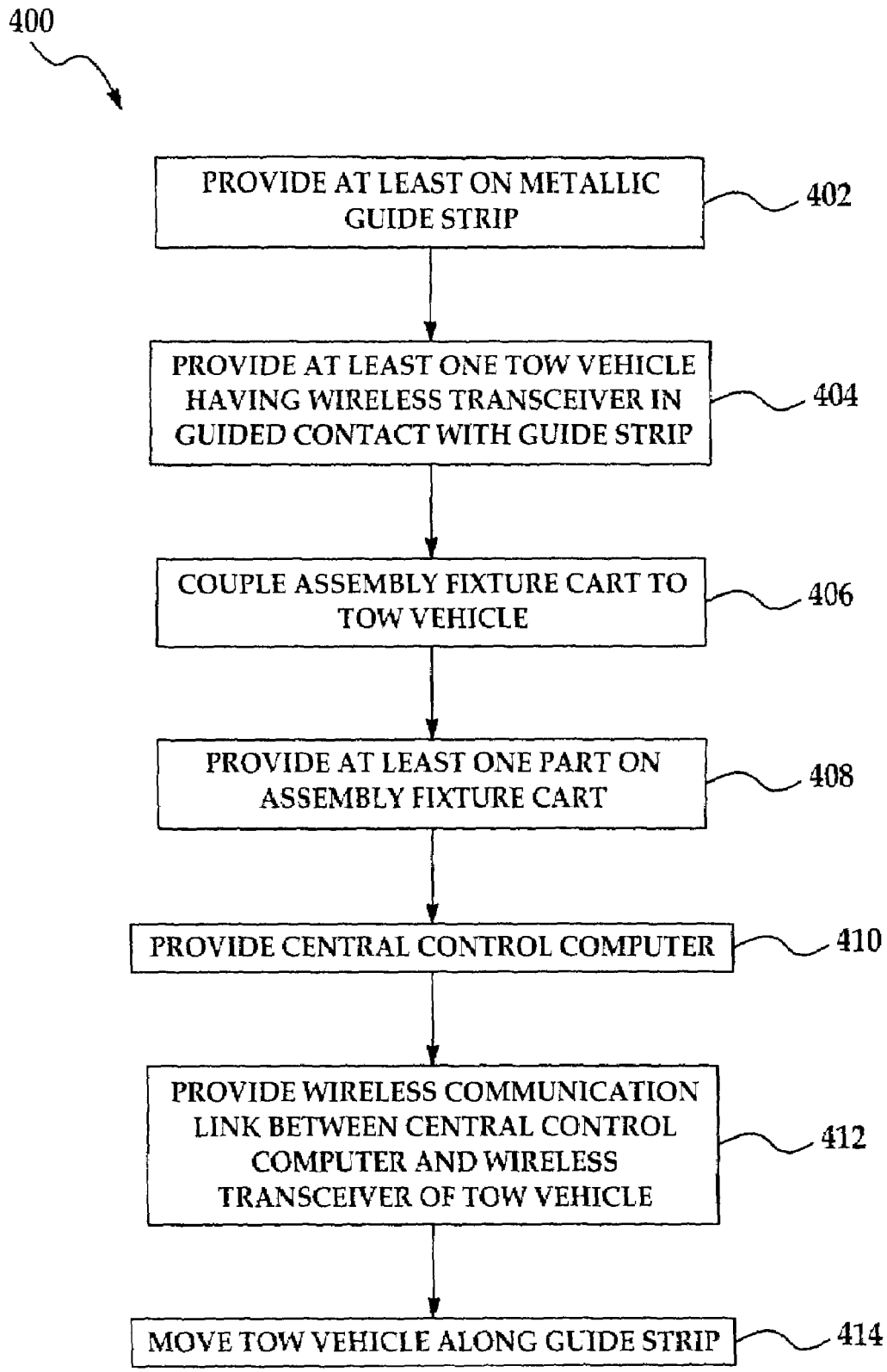
FIG. 4 is a flow diagram illustrating an exemplary production moving line method.

Referring next to FIG. 4, a flow diagram 400 which illustrates an exemplary production moving line method is shown. In block 402, at least one metallic guide strip is provided. In block 404, at least one tow vehicle having a wireless transceiver is provided in guided contact with the guide strip. In block 406, an assembly fixture cart is coupled to the tow vehicle. In block 408, at least one part is provided on the assembly fixture cart. In block 410, a central control computer is provided. In block 412, a wireless communication link is provided between the central control computer and the wireless transceiver of the tow vehicle. In block 414, the tow vehicle is moved along the guide strip.

Figure 5:
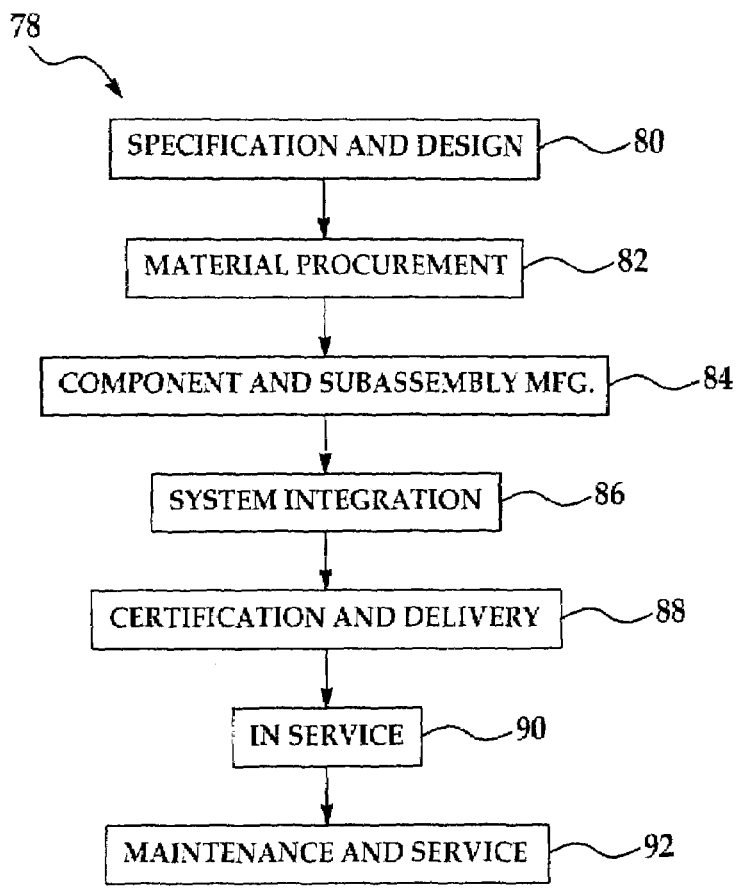
FIG. 5 is a flow diagram of an aircraft production and service methodology.
Figure 6:
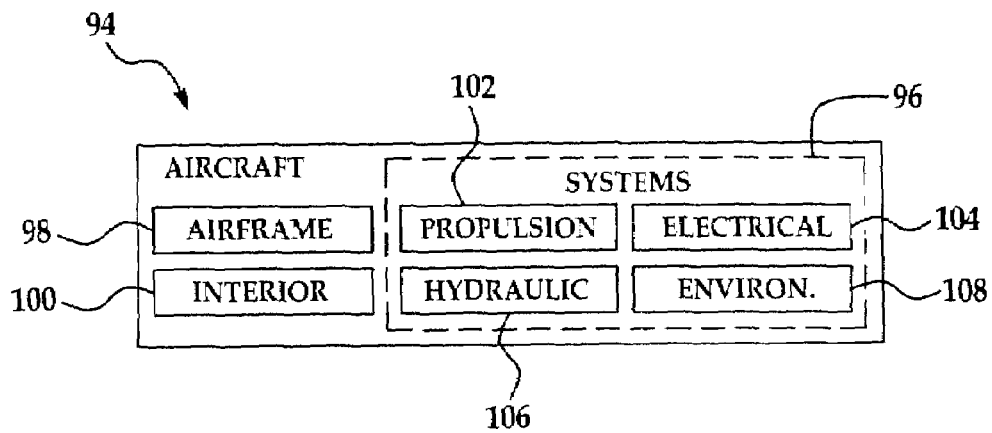
FIG. 6 is a block diagram of an aircraft.

Referring next to FIGS. 5 and 6, embodiments of the disclosure may be used in the context of an aircraft manufacturing and service method 78 as shown in FIG. 5 and an aircraft 94 as shown in FIG. 6. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A production moving line system, comprising:
   at least one metallic guide strip;
   at least one tow vehicle adapted to follow said guide strip;
   said at least one tow vehicle comprises control circuitry and a power source and a wireless transceiver connected to said control circuitry;
   an assembly fixture cart coupled to said tow vehicle;
   a central control computer; and
   a wireless communication link between said central control computer and said wireless transceiver of said tow vehicle.

2. The system of claim 1 further comprising a user interface pendant connected to said control circuitry.

3. The system of claim 1 wherein said power source comprises at least one battery.

4. The system of claim 3 further comprising a battery recharging system connected to said battery.

5. The system of claim 1 further comprising a data input/output device connected to said circuitry.

6. The system of claim 1 wherein said assembly fixture cart comprises a cart base having a plurality of cart wheels, a cart frame carried by said cart base and a cart platform carried by said cart frame.

7. The system of claim 6 wherein said tow vehicle is coupled to said cart base of said assembly fixture cart.

8. The system of claim 1 wherein said tow vehicle comprises a vehicle housing.

9. A production moving line system, comprising:
   a plurality of production work stations;
   at least one metallic guide strip extending generally adjacent to said production work stations;
   at least one tow vehicle adapted to follow said guide strip;
   said at least one tow vehicle comprises control circuitry having memory, at least one battery connected to said control circuitry, a wireless transceiver connected to said control circuitry, a position sensing mechanism connected to said control circuitry and adapted to sense said guide strip, a drive motor connected to said control circuitry, at least one wheel drivingly engaged by said drive motor and a steering mechanism connected to said control circuitry and coupled to said at least one wheel;

an assembly fixture cart coupled to said tow vehicle;

a central control computer; and a wireless communication link between said central control computer and said wireless transceiver of said tow vehicle.

10. The system of claim 9 further comprising a user interface pendant connected to said control circuitry.

11. The system of claim 9 further comprising a battery recharging system connected to said battery.

12. The system of claim 9 further comprising a data input/output device connected to said circuitry.

13. The system of claim 9 wherein said assembly fixture cart comprises a cart base having a plurality of cart wheels, a cart frame carried by said cart base and a cart platform carried by said cart frame.

14. The system of claim 13 wherein said tow vehicle is coupled to said cart base of said assembly fixture cart.

15. The system of claim 9 wherein said tow vehicle comprises a vehicle housing.

16. The system of claim 9 wherein said at least one tow vehicle comprises a plurality of tow vehicles and further comprising a wireless communication link between said tow vehicles.

17. A production moving line method, comprising the steps of:

providing at least one metallic guide strip;

providing at least one tow vehicle having a wireless transceiver in guided contact with said guide strip;

coupling an assembly fixture cart to said at least one tow vehicle;

providing at least one part on said assembly fixture cart;

providing a central control computer;

providing a wireless communication link between said central control computer and said wireless transceiver of said tow vehicle; and moving said tow vehicle along said guide strip.

18. The method of claim 17 further comprising connecting a user interface pendant to said tow vehicle and controlling said tow vehicle by operation of said user interface pendant.

19. The method of claim 17 further comprising providing at least one battery, powering said tow vehicle using said at least one battery and recharging said at least one battery during operation of said tow vehicle.

20. The method of claim 17 wherein said at least one tow vehicle comprises a plurality of tow vehicles and further comprising providing a wireless communication link between said plurality of tow vehicles.

* * * * *